United States Patent
Luinaud et al.

(10) Patent No.: US 10,190,655 B2
(45) Date of Patent: Jan. 29, 2019

(54) TOOL FOR BALANCING A TURBINE ENGINE MODULE

(71) Applicant: Safran Aircraft Engines, Paris (FR)

(72) Inventors: Alain Roland Luinaud, Moissy-Cramayel (FR); Alain Decocq, Moissy-Cramayel (FR); Francois Viviande, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 15/738,091

(22) PCT Filed: Jun. 21, 2016

(86) PCT No.: PCT/FR2016/051513
§ 371 (c)(1),
(2) Date: Dec. 19, 2017

(87) PCT Pub. No.: WO2017/001745
PCT Pub. Date: Jan. 5, 2017

(65) Prior Publication Data
US 2018/0172111 A1    Jun. 21, 2018

(30) Foreign Application Priority Data
Jul. 1, 2015 (FR) ...................... 15 56220

(51) Int. Cl.
*F01D 5/02* (2006.01)
*G01M 1/02* (2006.01)
(Continued)

(52) U.S. Cl.
CPC .......... *F16F 15/322* (2013.01); *F01D 25/285* (2013.01); *G01M 1/02* (2013.01);
(Continued)

(58) Field of Classification Search
CPC ........... G01M 1/24; G01M 1/02; F01D 5/027; F01D 5/06; F01D 5/025; F01D 25/285
See application file for complete search history.

(56) References Cited

U.S. PATENT DOCUMENTS

| 3,146,623 A | * | 9/1964 | Wilkins | ................. G01M 1/02 73/460 |
| 4,044,442 A | * | 8/1977 | Carlson | ................. F01D 25/285 29/428 |

(Continued)

OTHER PUBLICATIONS

International Search Report with English Language Translation, dated Oct. 17, 2016, Application No. PCT/FR2016/051513.

(Continued)

*Primary Examiner* — Helen C Kwok
(74) *Attorney, Agent, or Firm* — Womble Bond Dickinson (US) LLP (57) ABSTRACT

Tooling for balancing a turbine engine module (10) in a balancing machine, the turbine engine module having at least one stator housing (14) and a rotor (16) having a shaft (18) with a longitudinal axis A and at least one blade stage (20) surrounded by the stator housing (14). The tooling has at least a balancing frame (14), having rotor (16) guide bearings, first and second annular plates (30, 32) designed to be attached to the stator housing (14), third and fourth attachment lugs (34, 36) provided on the balancing frame (24), to attach the first and second annular plates (30, 32) to the frame. A trolley is for transporting the frame (24), and a support (84, 94) for supporting the frame, provided on the balancing frame (24) and cooperating equally well with the balancing machine and with the trolley.

14 Claims, 7 Drawing Sheets

(51) Int. Cl.
  *F01D 25/28*  (2006.01)
  *F16F 15/32*  (2006.01)
  *G01M 1/04*   (2006.01)
  *G01M 1/08*   (2006.01)
  *G01M 1/10*   (2006.01)
  *G01M 1/28*   (2006.01)

(52) U.S. Cl.
  CPC ............... *G01M 1/04* (2013.01); *G01M 1/08* (2013.01); *G01M 1/10* (2013.01); *G01M 1/28* (2013.01); *F01D 5/027* (2013.01)

(56) References Cited

U.S. PATENT DOCUMENTS

| | | | | |
|---|---|---|---|---|
| 4,157,613 A * | 6/1979 | Morrow | ............... | H02K 15/16 29/596 |
| 4,451,979 A * | 6/1984 | Schuster | ............... | F01D 25/285 29/281.4 |
| 4,455,887 A * | 6/1984 | Lissajoux | ............... | F01D 5/027 464/180 |
| 4,567,649 A * | 2/1986 | Ades | ............... | B23P 11/025 219/391 |
| 4,586,225 A * | 5/1986 | Bouiller | ............... | F01D 5/027 29/426.1 |
| 6,341,419 B1 * | 1/2002 | Forrester | ............... | F01D 5/027 29/889.2 |
| 7,555,939 B2 * | 7/2009 | Lucas | ............... | F01D 5/027 73/457 |
| 8,672,606 B2 * | 3/2014 | Glynn | ............... | F01D 25/28 184/1.5 |
| 9,896,973 B2 * | 2/2018 | Lanni | ............... | F01D 25/285 |

OTHER PUBLICATIONS

"Balancing of Machinery Components", Machinery Component Maintenance and Repair, 2005, 258-358.

* cited by examiner

TOOL FOR BALANCING A TURBINE ENGINE MODULE

More particularly, the invention relates to tooling for balancing a turbine engine module of high mass or of large size in a horizontal balancing machine, of the type that is used in the field of aeronautical motorisation for the purpose of balancing rotors of aeronautical turbine engines.

PRIOR ART

A turbine engine has, in a known manner, one or more rotors which are rotatably mounted in a stator.

A current modern turbine engine is produced according to a modular design and as such it has at least one rotor which is made up of a plurality of elements manufactured separately and assembled mechanically. Similarly, the stator of a turbine engine of this kind is made up of a plurality of stator housings that are fitted to one another.

Thus, a turbine engine is made up of an assembly of modules, at least some of which have at least one stator housing and an associated rotor that essentially has a rotor shaft with a longitudinal axis A and at least one blade stage that is connected to a longitudinal end portion of said rotor shaft, and which is surrounded by said stator housing.

Conventionally, the balancing of the rotor is performed separately from the stator. A configuration of this kind is known for example from the documents "*Machinery Component Maintenance and Repair*", Heinz Bloch et al., chapter 6, and U.S. Pat. No. 3,146,623-A, which describe the balancing of bare rotors.

According to another known configuration, the balancing of the rotor is performed in place in the stator. The assembly of the rotor and the stator, or module, is performed directly in a balancing machine, that is to say that the elements constituting said turbine engine module are mounted and supported directly in the balancing machine, without an interface of any kind whatsoever. U.S. Pat. No. 4,586,225-A describes a balancing operation of this kind.

Thus, the stator housing is attached directly to a frame of the balancing machine, and the corresponding rotor is supported directly by bearings of the balancing machine.

This configuration provides overall satisfaction for modules of small or average sizes, but it is not appropriate for modules of large sizes and high masses for which the dimensions and the weight represent a constraint in terms of manipulation of said module in said balancing machine.

Furthermore, increasing the mass of the module associated with the tooling makes it necessary to check that the natural modes of the assembly are outside the field of application of the balancing machine.

In addition, it is impossible to consider moving a turbine engine module of large size manually in order to install it in the balancing machine without risk of damage.

The functional clearances between the blade stage and the stator housing are substantially the same, whether the turbine engine module is a module of small or medium size, or a module of large size.

For this reason, it is easily understood that a manipulation of a module of large size, more likely to lead to an unsuitable movement of the rotor relative to the stator housing, could lead to unsuitable contact between the blades of the blade stage and the stator housing, which could lead to damage to said stator housing and to said blade stage.

It is therefore necessary to provide tooling allowing a turbine engine module to be supported, lifted, transported and installed in the balancing machine, using a limited number of interfaces that allow said module to be transported securely, set down and fixed in the balancing machine without risk of damage.

Furthermore, the balancing of a turbine engine module directly supported by the balancing machine involves performing a certain number of adjustments during the installation of each module, which considerably increases the total duration of a balancing operation. There is therefore a need for tooling that allows the balancing operations to be rationalised.

DESCRIPTION OF THE INVENTION

The invention meets this need by proposing tooling for balancing a turbine engine module of the type described above, characterised in that said tooling has at least:
- a balancing frame, having bearings designed to receive and to guide the shaft and the rotor blade stage, the position of at least one of said bearings being adjustable relative to said frame;
- first and second means designed to be attached to said stator housing;
- third and fourth means provided on said frame, to attach said first and second means, respectively, to said frame, the position of at least one of said third and fourth means being adjustable relative to said frame;
- fifth means for transporting the frame;
- sixth means for supporting the frame, provided on said frame and designed to cooperate equally well with the balancing machine and with the fifth means for transporting the frame, in order to support said frame in said fifth means for transport and in said balancing machine.

According to other features of the invention:
- the tooling has seventh removable means for locking the rotor relative to the stator housing, said means being intended to immobilise the rotor relative to the stator housing while it is being transported to the balancing machine;
- said first means have an annular plate, which is designed to be attached to a first end of the stator housing, which is intended to cooperate with the third means of the frame, and an inner peripheral edge of which has the seventh removable means for locking the rotor;
- said second means have a ring, which is designed to be attached to a second opposite end of the stator housing, which is intended to cooperate with the third means of the frame, and which has a means for adjusting the vertical and transverse position of the stator housing;
- the balancing frame has, at a first end near the stator housing, a first offset support guide bearing, which has a tubular element of which a first end, intended to be introduced into the stator housing, has at least one bearing for rotatably receiving a support shaft received in the blade stage, and of which a second opposite end, intended to project outside the stator housing, has at least one peripheral bearing surface which is clamped to a first support that is rigidly connected to the frame.
- the balancing frame has, at a second end, a second guide bearing with rollers that has a plate carrying two rollers on which the shaft is intended to roll, said plate being carried by a second support that is rigidly connected to the frame, and the position of said plate being capable of being adjusted transversely and vertically relative to said second support, then immobilised definitively in an adjusted position by means of pins traversing the plate and said second support, and locked in said position by means of clamping screws arranged with clearance between the plate and the support;

the fifth means for transporting the frame have a trolley able to carry the frame;

the first and second supports have a semi-cylindrical cross section and the transport trolley and the balancing machine have semi-cylindrical receiving bearing surfaces that are adjustable transversely and vertically and are complementary to said first and second supports which form the sixth means for supporting the frame, and means for clamping said first and second supports in said receiving bearing surfaces;

the tooling has eighth means for lifting the module, having slings intended to cooperate with the annular plate and with an end support of the shaft of the rotor, and which are capable of allowing the module to be lifted, and a removable intermediate support connecting the shaft of the rotor to the stator housing;

the tooling has ninth means for lifting the frame having slings intended to cooperate with the annular plate and the second support, and which are capable of allowing the frame to be lifted;

the frame has an open shape that is trapezoid or U-shaped and it has at least one horizontal leg capable of resting on the trolley and two legs, including at least one vertical leg, of which the ends carry the bearings of the frame;

The invention also relates to a calibration assembly for adjusting tooling according to the preceding claim, characterised in that it has:

a reference stator housing, consisting of a stack of pig moulds of a mass corresponding to that of the stator of the module, and which is intended to rest on the frame in a position corresponding substantially to the point of application of the weight of the stator housing of the module; and a balanced reference rotor, having a moment of inertia and moment of unbalance corresponding substantially to the rotor of the module to be balanced.

The invention also relates to a method for adjustment before balancing of a balancing machine and of tooling, using a calibration assembly of the type described above, which has:

a first step of static adjustment of the balancing machine, during which the semi-cylindrical bearing surfaces of the balancing machine are adjusted so that they are coaxial;

a second step during which a reference rotor and a reference stator housing are installed in the frame;

a third step during which the frame fitted with the reference rotor and the reference stator housing is transferred onto the semi-cylindrical bearing surfaces of the balancing machine, a fourth step of dynamic adjustment on the machine during which the vertical position of the rollers relative to the plate of the second bearing is adjusted, so that the axes of the bearings are parallel to an axis of a drive shaft of the balancing machine, then the plate and the second support are perforated and rods are inserted into the perforations made in order to define the position of the plate, and lastly the plate is locked relative to the second support.

Finally, the invention relates to a method for balancing a turbine engine module, characterised in that it has:

a first step of lifting and positioning, using the eighth means for lifting, a module in a frame received in the fifth means for transporting tooling of the type described above;

a second step of transporting the module fitted with the frame to the balancing machine, using the fifth means for transport;

a third step of lifting and transferring the module fitted with the frame into the balancing machine using the ninth means for lifting; and a fourth step of balancing the module in the balancing machine.

DESCRIPTION OF THE FIGURES

The invention will be better understood and its other aims, details, features and advantages will become clearer in the course of the following detailed explanatory description of an embodiment of the invention, given as a purely illustrative and non-limiting example, with reference to the accompanying diagrammatic drawings, in which.

DETAILED DESCRIPTION OF AN EMBODIMENT OF THE INVENTION

In the description that follows, identical reference signs designate parts that are identical or that have similar functions.

FIGS. 1 to 14 show tooling for balancing a turbine engine module 10 in a balancing machine 12.

Figure 13:
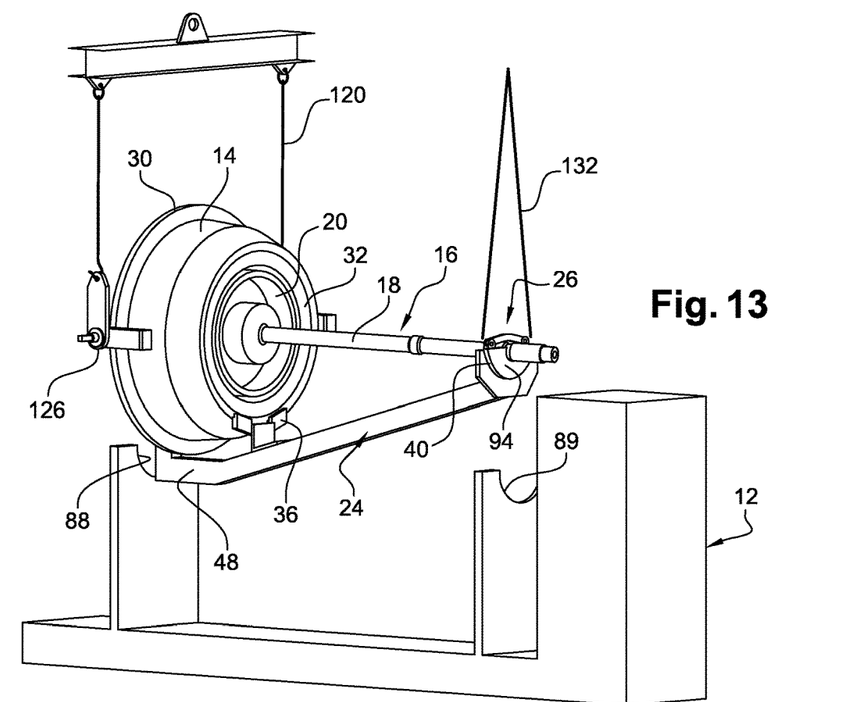
FIG. 13 is a perspective view showing the module fitted with the frame on approach to the balancing machine.
Figure 14:
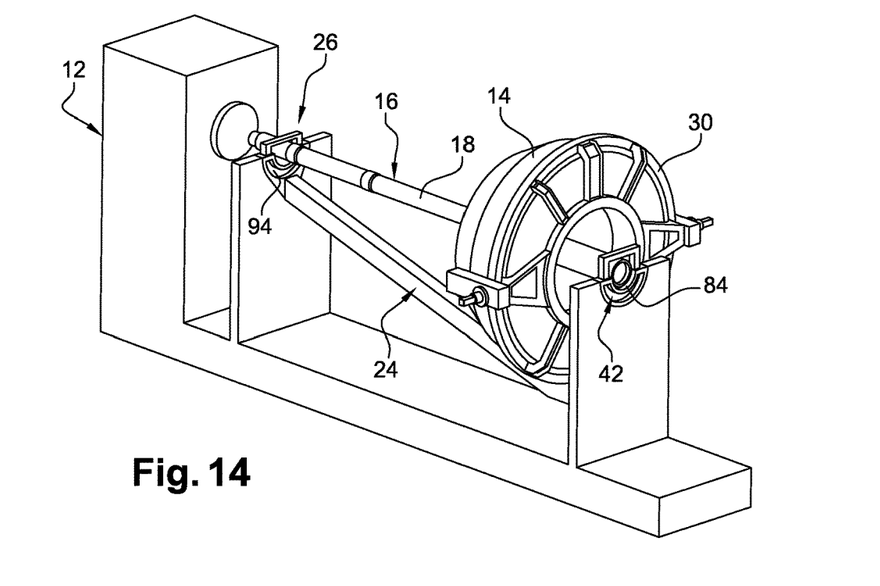
FIG. 14 is a perspective view showing the module fitted with the frame received in the balancing machine.

The balancing machine 12 in particular has been shown schematically in FIGS. 13 and 14.

In a known manner, a turbine engine module 10 has at least one stator housing 14 and a rotor 16. The rotor 16 has a shaft 18 with a longitudinal axis A and at least one blade stage 20 which is connected to a longitudinal end portion 22 of said rotor shaft 18 and which is surrounded by said stator housing 14.

Figures 1, 2, 3:
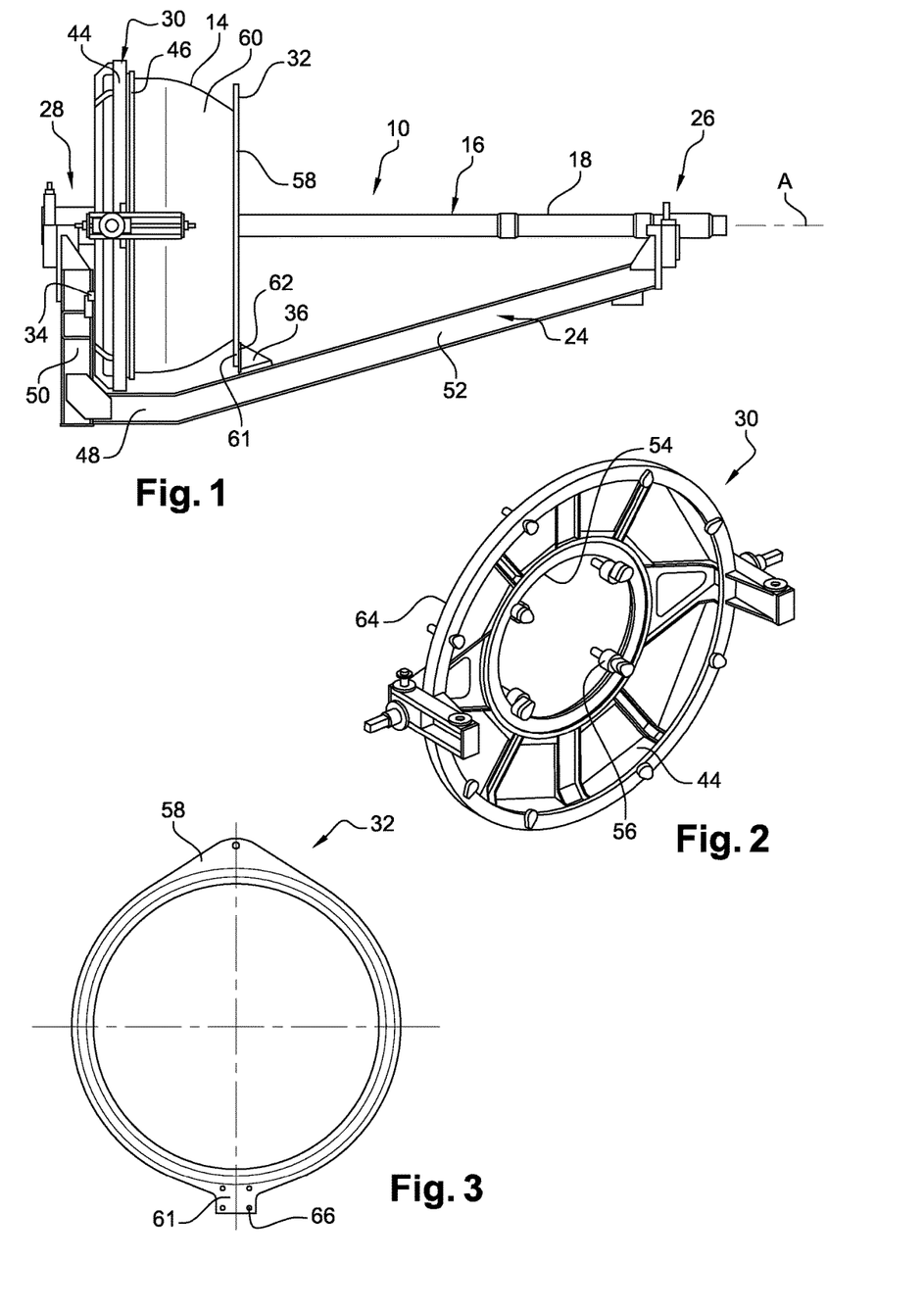
FIG. 1 is a side view of a turbine engine module received in a balancing frame produced according to the invention.
FIG. 2 is a perspective view of the first means designed to be attached to the stator housing.
FIG. 3 is an axial view of the second means designed to be attached to the stator housing.
Figure 8:
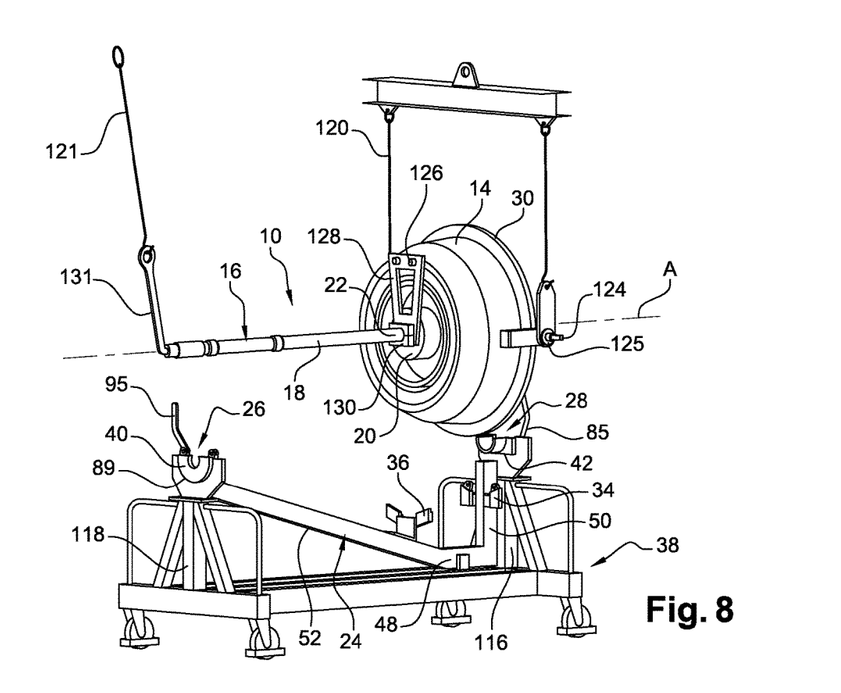
FIG. 8 is a perspective view showing a first step of lifting and positioning, in a frame received in the fifth means for transport, of a turbine engine module using the eighth means for lifting.

This configuration is shown in detail in FIGS. 1 and 8.

Usually, a module 10 of this kind is received directly in the balancing machine 12, that is to say that the shaft 18 and the blade stage 20 are rotatably mounted directly in the balancing machine 12, and the stator housing 14 is attached directly to said balancing machine 12.

This configuration provides overall satisfaction in the context of modules 10 of small or average sizes, but it is particularly difficult to implement in the context of modules 10 of large sizes or high masses, the handling of which proves to be problematic.

The invention overcomes this disadvantage by proposing tooling that allows the easy and repeatable installation of a module 10 of this kind in a balancing machine 12.

For this purpose, the tooling has at least one balancing frame 24 which is intended to receive the module 10.

The balancing frame 24 has bearings 26 and 28 which are designed to respectively receive and guide the shaft 18 and the blade stage 20 of the rotor 16.

According to the invention, the position of at least one of said bearings 26, 28 can be adjusted relative to the frame 24 to allow the rotor 10 to be adjusted relative to the balancing machine 12, as will be seen in the next part of this description.

The tooling also has first and second means 30, 32 that are designed to be attached to the stator housing 14.

The tooling also has third and fourth means 34, 36 which are provided on the frame 24 and which are intended to allow the first means 30 and the second means 32 to be attached to said frame 24.

Advantageously, the position of at least one of the third and fourth means 34, 36 can be adjusted relative to said frame 24.

The tooling also has fifth means 38 for transporting the frame that are intended to allow the frame 24 to be conveyed to the balancing machine 12.

An essential feature of the invention is that the tooling advantageously has sixth means 40, 42 which are provided on the frame 24 and which are designed to cooperate equally well with the balancing machine 12 and with the fifth means 38 for transporting the frame 24 in order to support said frame 24 in the fifth means 38 for transporting the frame or in the balancing machine 12 so as to allow the frame 24 to be easily transferred from said fifth means 38 for transport to said balancing machine 12.

The above-mentioned means will now be described more explicitly.

According to the invention, the first means 30 have, as shown in FIG. 2, an annular plate 44 that is attached to a first end 46 of the stator housing 14, as shown in FIG. 1.

The annular plate 44 is intended to cooperate with the third means 34 of the frame. In the preferred embodiment of the invention, the frame 24 has an open trapezoid shape and it has at least one horizontal leg 48 that is intended to rest on the fifth means 38 for transport, and on either side of said leg 48 it has two legs, namely a vertical leg 50 and an inclined leg 52.

It will be understood that this configuration does not limit the invention and that the frame 24 could have another open shape, for example an open U shape having, in the same manner, a horizontal leg 48 and two vertical legs.

The vertical leg 50 has an attachment lug 34 that constitutes the third means of the frame, to which lug is attached the annular plate 44 constituting the first means attached to the stator housing 14.

Furthermore, the annular plate 44 not only allows the stator housing 14 to be carried, but it also allows the rotor 16 to be clamped relative to the stator housing 14.

For this purpose, an inner peripheral edge 54 of the annular plate has removable means for locking the rotor 16 relative to the stator housing 14, which means are intended to immobilise the rotor 16 relative to the stator housing 14 while it is transported to the balancing machine 12.

For example, said seventh removable means for locking have eccentric nuts 56 which are arranged angularly and regularly around the inner peripheral edge 54 of the annular plate 44, as shown in FIG. 2, and which are intended to extend radially inwards so as to be in contact with a bearing surface (not shown) of the blade stage 20 in order to immobilise said blade stage 20 inside the stator housing 14, this being done in order to prevent the rotor 16 from rotating relative to the stator housing 14.

The second means 32 that are designed to be attached to the stator housing 14 have a ring 58 which, as shown in FIG. 1, is intended to be attached to the stator housing 14 by a second end 60 of the stator housing 14 and which is intended to cooperate with the fourth means 36 provided on the frame 24.

In the preferred embodiment of the invention, the fourth means 36 are formed by a lug 36 which is attached to the inclined leg 52 of the frame 24, and which is attached to a lower portion 60 of the ring 58 which is shown in FIG. 3, to allow said ring 58 to abut the inclined arm 52 of the frame.

The second means 32 and the fourth means 36 advantageously allow to support the weight of the stator housing 14, which in their absence would be cantilevered, so as to allow said stator to be held so that it is coaxial with the shaft 18 of the rotor 16 and thus prevent any interference between said stator housing 14 and the blade stage 20.

Advantageously, the fourth means formed by the lug 36 can be adjusted relative to the lower portion 60 of the ring 58 so as to allow said ring 58 to be adjusted in the vertical direction of said ring 58. This configuration allows the coaxiality of the housing 14 and of the rotor 16 to be adjusted.

This configuration prevents the housing 14 from being cantilevered relative to the vertical arm 50 of the frame 24, and prevents its weight from tending to put the rotor 16 out of alignment.

It will be noted that, in a known manner, the annular plate 44, like the ring 58, can be attached to the stator housing 14 by means of screws and nuts. For example, in FIG. 2, attachment nuts 64 can be seen arranged around the periphery of the annular plate 44.

Furthermore the attachment lug 36 of the inclined arm 52 of the frame 24 has perforations that are intended to be arranged opposite perforations 66 in the lower portion of the ring 58. Said perforations are intended to be traversed, with clearance, by screws 62 so as to allow a displacement of the ring 58 relative to the lug 36 and then allow it to be locked. Thus the screws 62 form a simple means for adjusting the vertical and transverse position of the stator housing 14, which ensures that the stator housing 14 is coaxial with the rotor 16.

To provide guidance in rotation for the rotor 16 in the frame 24, the balancing frame 24 has, at a first end that is arranged close to the stator housing 14, that is to say at the end of the vertical arm 50, a first offset support guide bearing 28.

Figure 5:
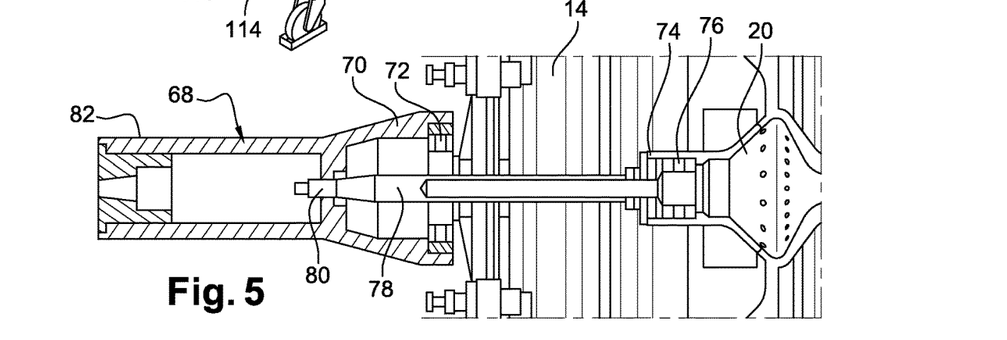
FIG. 5 is a view in axial cross section of the first offset guide bearing of the turbine engine module.
Figure 6:
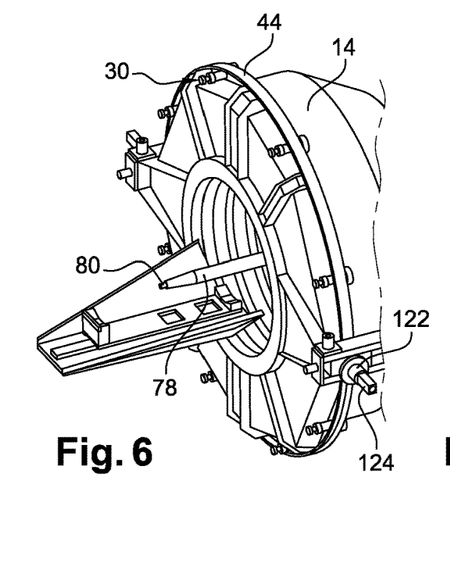
FIGS. 6 and 7 are perspective views showing the mounting of an offset guide bearing in the turbine engine module.
Figure 7:
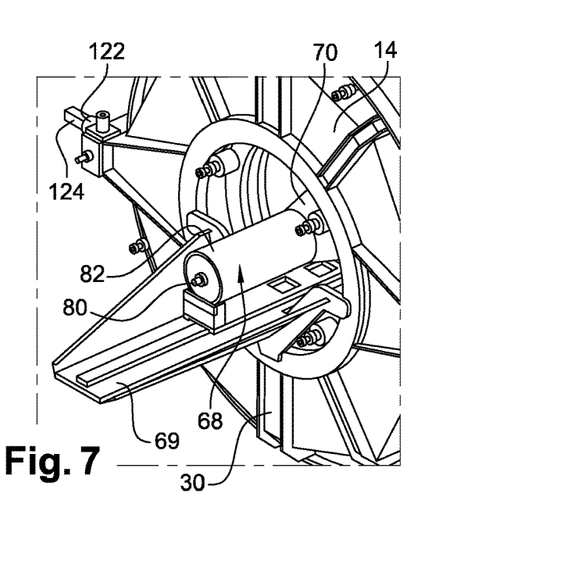

The offset support guide bearing 28, also known technically as a "dummy bearing", essentially has, as shown in FIGS. 5 to 7, a tubular element 68 that has a first end 70 which is intended to be introduced into the stator housing 14, as shown in FIG. 7. Said end 70 has at least one bearing 72 for rotatably receiving the blade stage 20.

More specifically, the blade stage 20 has an end bearing surface 74 that is rotatably mounted inside the bearing 72 of the tubular element 70, but also by means of a bearing 76 that is mounted around a support shaft 78 which is received inside the housing 14 inside the blade stage 20 and an end 80 of which, which projects outside the housing 14, is received in the tubular element 68. This mounting provides guidance in rotation of the blade stage 20 radially between the support shaft 78 and the tubular element 68.

Figure 9:
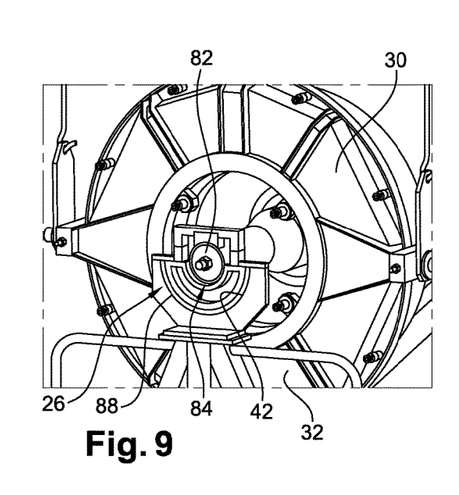
FIG. 9 is a detailed perspective view showing the clamping of the first offset guide bearing in the frame.

A second end 82 of the tubular element 68 is intended to project outside the stator housing 14 and it has a peripheral bearing surface which, as shown in FIG. 9, is clamped to a first support 84 that is rigidly connected to the frame 24. The peripheral bearing surface is axially offset from the bearing 76, since it is supported outside the stator housing 14.

In order to mount the offset guide bearing 28, the support shaft 78 is therefore first introduced into the bearing 76 of the blade stage 20, as shown in FIG. 6, then the support shaft is introduced into the tubular element 68 that is slid into the stator housing 84 by means of a guide ramp 69, as shown in FIG. 7.

The tubular element 68 can then be attached to the frame 24.

More specifically, as shown in FIG. 9, the first support 84 that is rigidly connected to the frame 24, which receives the peripheral bearing surface 82 of the tubular element 68, has a semi-cylindrical cross section and it has an outer periphery 42 that forms the sixth means for supporting the frame which are designed to cooperate equally well with the balancing machine 12 or with the transport means 38.

Figure 11:
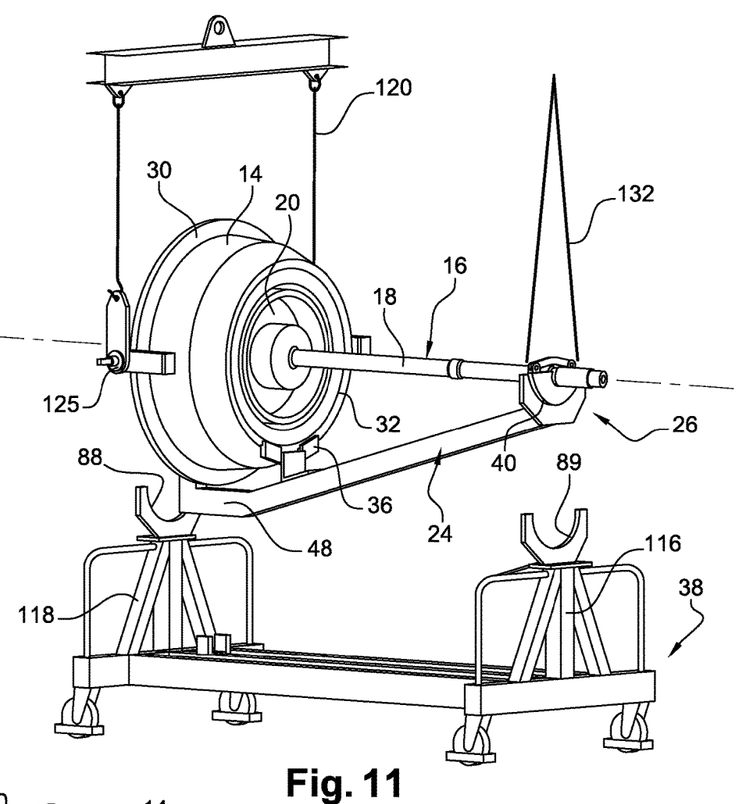
FIG. 11 is a perspective view showing a third step of lifting and transferring the module fitted with its frame using the ninth means for lifting.
Figure 12:
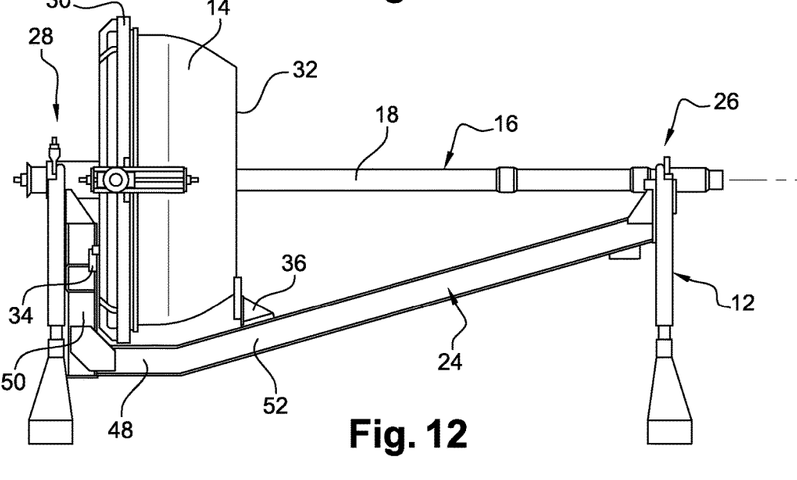
FIG. 12 is a side view showing the module fitted with the frame received in the receiving bearing surfaces of the balancing machine.

For this purpose, the transport means 38 and the balancing machine 12 have bearing surfaces 88 for receiving the first support 84, said surfaces being complementary to the outer periphery 42 of the support 84, as shown in FIGS. 11 and 13.

The transport means 38 and the balancing machine 12 have, in addition, means 85 for clamping the first support 84 so as to allow it to be immobilised relative to the transport means 38 or to the balancing machine 12. For example, in FIG. 8, the clamping means 85 of the transport means 38 has a locking lever that pivots transversely.

However, it will be understood that any known means from the prior art can be suitable for the proper implementation of said clamping means.

Figure 10:
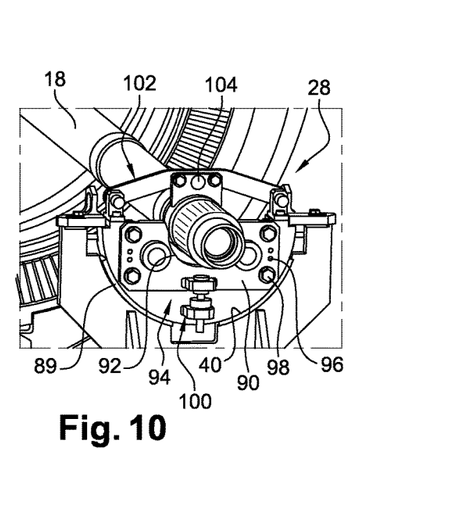
FIG. 10 is a detailed perspective view showing the rotor shaft being received in the second support and the second support being received in a receiving bearing surface of the fifth means for transport.

At a second end of the balancing frame 24, which corresponds to the end of its inclined leg 52, the balancing frame 24 has a second guide bearing 26 with rollers that has, as shown in FIG. 10, a plate 90 carrying two rollers 92 on which the shaft 18 is intended to roll.

The plate 90 is carried by a second support 94 that is rigidly connected to the frame 24. Clamping screws 98 are arranged with clearance between the plate 90 and the second support 94 so as to allow a latitude of adjustment of the plate 90 relative to the second support 94.

When the screws 98 are loosened, the position of the plate 90 can first be adjusted transversely and vertically relative to said second support 94, and can then be definitively immobilised in an adjusted position relative to the second support 94. The plate 90, once it has been adjusted on the second support 94, is perforated at the same time as the second support 94, and is locked in this position by means of pins 96 that are received in the perforations that then traverse the plate 90 and the second support 94. The plate 90 is then locked in said position by means of clamping screws 98.

In this manner, the position of the axis of the shaft 18 relative to the second support 94 is defined.

Advantageously, a thumbwheel and worm screw adjustment system 100 can be arranged between the second support 94 and the plate 90 to vertically adjust the position of the plate 90 relative to the second support 94.

The shaft 18 can be held in contact with the rollers 92 of the plate 90 by means of a transverse clamp 102 which is attached at its opposite ends to the support 94 and which has a central roller of which the axis 104 can be seen in FIG. 10. The roller rolls on the axis 18 and therefore allows the shaft 8 to remain in contact with the rollers 92.

As will be seen in the next part of this description, the possibility of vertically adjusting the second bearing 28 ensures that the axis A of the rotor 16 is parallel to an axis B of the balancing machine so as to prevent the blade stage 20 from having an unbalance because of its inclination.

In the same manner as above, the second support 94 has a semi-cylindrical cross section having a cylindrical bearing surface 40 that is intended to be received in complementary semi-cylindrical receiving bearing surfaces 89 of the transport means 38 and of the balancing machine 12.

In the same manner as for the first support 84, clamping means, such as a lever 95 shown in FIG. 8, allow the second support to be immobilised in said receiving bearing surfaces 89.

Figure 4:
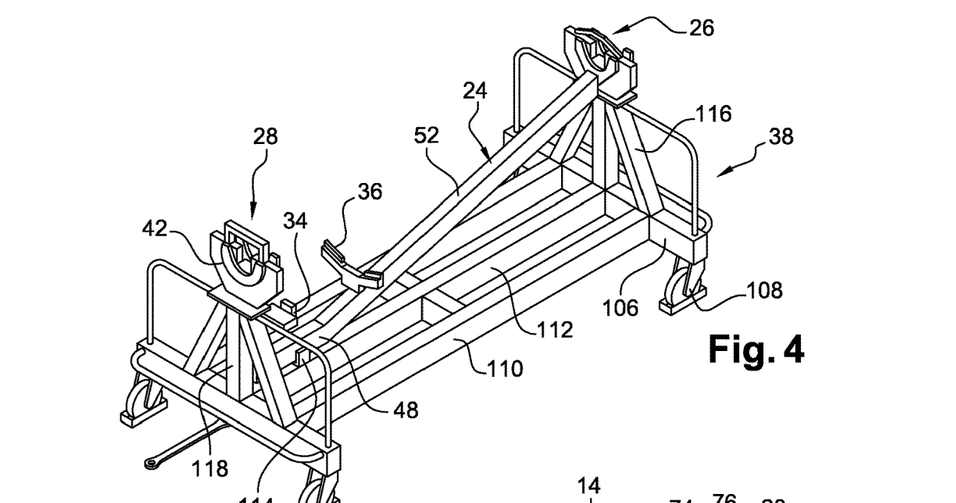
FIG. 4 is a perspective view showing the fifth means for transporting the frame receiving a frame.

As shown in FIG. 4, the fifth means 38 for transporting the frame are preferably formed by a trolley 38 capable of carrying the frame 24.

Essentially, said trolley 38 has two transverse beams 106 provided at the transverse ends thereof with castors 108, and between which is arranged a structure 110 on which the horizontal leg 48 of the frame 24 is able to rest.

For example, said structure 110 has a central beam 112 that has two vertical lugs 114 intended to laterally immobilise the horizontal leg 48 of the frame 24.

The trolley 38 has two vertical brackets 116, at the end of which the semi-cylindrical receiving bearing surfaces 40, 42 are arranged.

In order to allow the module 16 to be installed in the frame 24, the tooling has eighth means for lifting the module 16.

Said means have slings 120 that are intended to cooperate with the annular plate 44.

For this purpose, the annular plate 44 has two diametrically opposed horizontal arms 122 of which the ends are made into bearing surfaces 124 that can be received in rings 125 arranged at the end of the slings 120.

In addition, the eighth means for lifting the module 10 have a sling 121 and a support 131 intended to support the end of the shaft 18 of the rotor 16.

The eighth means for lifting also have, as shown in FIG. 8, a removable intermediate support 128 connecting the shaft 18 of the rotor 16 to the stator housing, said removable intermediate support 128 having for example a plate that is attached in its upper portion to the stator housing 14 by means of screws 126, and below which extends a clamp 130 gripping the shaft 18.

As shown in FIG. 8, the eighth means for lifting allow the rotor 16 and the stator housing 14 to be supported in order to place them in the frame 24. The support 128 can be removed after the stator housing 14 has been attached to the frame 24.

The tooling also has ninth means for lifting the frame 24 which are intended to allow the frame 24 to be lifted once the rotor 16 has been fitted to it.

As shown in FIG. 11, said ninth means for lifting have slings 120 of which the rings 125 are intended to cooperate with the diametrically opposed horizontal arms 124 of the support, but also slings 132 intended to be attached to the second support 94 to allow the frame 24 to be lifted by the end of its inclined leg 52.

The tooling assembly described above allows a turbine engine module 16 to be balanced according to a method that can be reproduced repeatedly for successive rotors 16.

The frame 24 is installed beforehand in the trolley 38, said frame 24 resting on said trolley by means of its horizontal leg 48, its vertical leg 50, and its inclined leg 52 which rest respectively on the semi-cylindrical bearing surfaces 88 and 89 of the brackets 118 and 116 of the trolley 38.

The method has a first step of lifting and positioning a module 10 in a frame 24, using the eighth means for lifting, as shown in FIG. 8. Once installed, the rotor 16 is clamped relative to the frame 44 of the housing 14 using eccentric screws 56.

Then, during a second step of transporting the module fitted with its frame 24, said module 10 fitted with its frame 24 is conveyed to the balancing machine 12 using the trolley 38, so as to position the trolley 38 in immediate proximity to the balancing machine 12.

There then follows a third step of lifting and transferring the module 10, fitted with the frame 24, into the balancing machine 12 using the ninth means for lifting described above.

In this instance, it is the whole of the module 10 and of the frame 24 that are transferred to the balancing machine 12.

In the same manner as above, the frame then rests on the semi-cylindrical bearing surfaces 88 and 89 of the balancing machine 12. The rotor 16 can then be unclamped.

Lastly, the method has a fourth step of balancing the module 10 in the balancing machine 12.

It should be noted, however, that a balancing operation of this kind is possible only provided that, firstly, the axis A of the rotor 16 is coaxial with the bearings 26 and 28 of the frame 24 and, secondly, the axis A of the rotor 16 is parallel to the axis B of the balancing machine 12, failing which the inclination of the module 10 will cause an unbalance to become apparent which will distort the reading of the balancing machine.

It is therefore necessary to adjust the frame 24 and the balancing machine 12 before the balancing operations.

Indeed, since the frame 24 is an open structure, the mass of the module 10 tends to open this structure and in particular to move the vertical leg 50 and the inclined leg 52 away from one another, so that the initial coaxiality of the bearings 26, 28 is altered by the installation of the module 10 in the frame 24.

In order to overcome this disadvantage, the invention proposes a calibration assembly 10' allowing the tooling to be adjusted.

Figure 15:
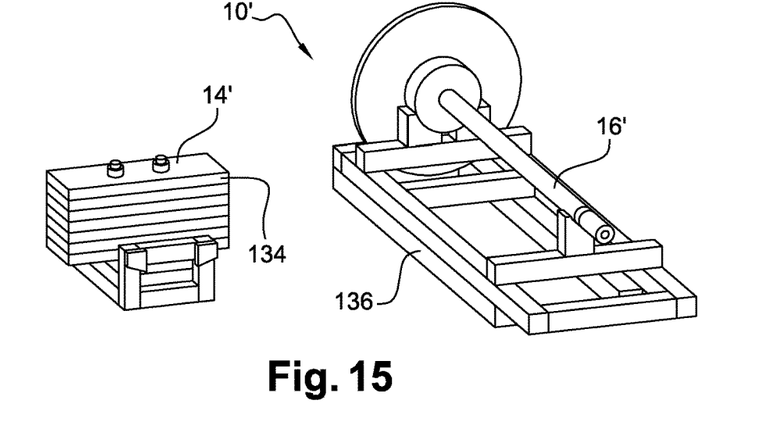
FIG. 15 is an overall perspective view of a reference stator housing and a reference rotor for calibrating tooling according to the invention.
Figure 16:
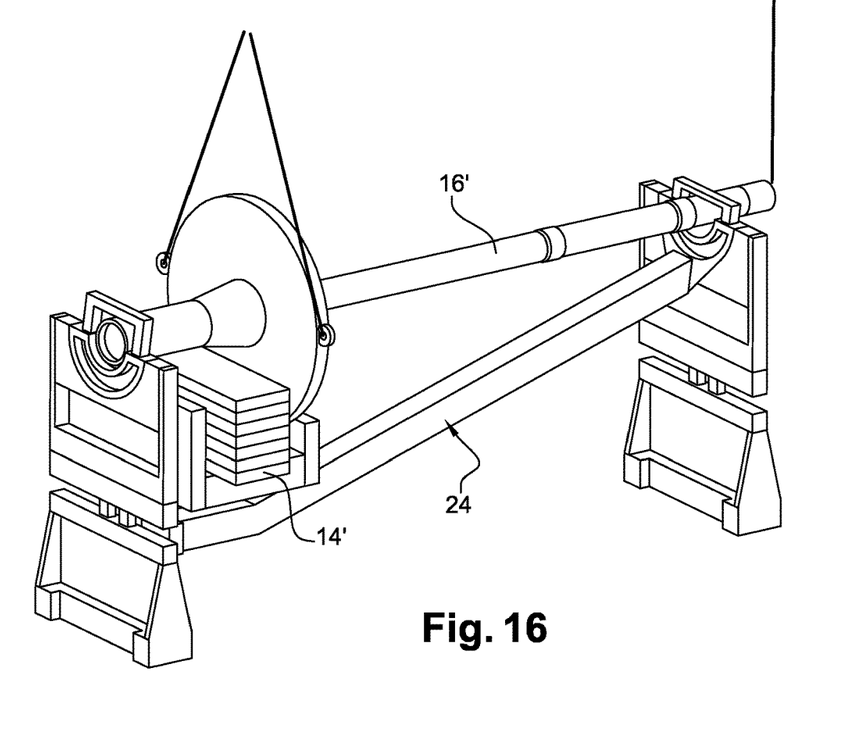
FIG. 16 is a perspective view showing the reference stator housing and the reference rotor received in a frame according to the invention.

As shown in FIG. 15, this calibration assembly has a reference stator housing 14' that consists of a stack of pig moulds 134 of a mass equivalent to that of the stator housing 14 that has to be balanced and which is intended to be positioned, as shown in FIG. 16, at the point of application of the weight of the stator housing 14 of the actual module 10.

The calibration assembly also has a balanced reference rotor 16', which is shown in FIG. 15 in a storage position on a support 136 intended to allow it to be stored when it is not in use. Said reference rotor 16' has a moment of inertia and moment of unbalance corresponding to the rotor 16 of the module to be balanced.

The operation to calibrate the frame 24 is performed in the following manner.

Figure 17:
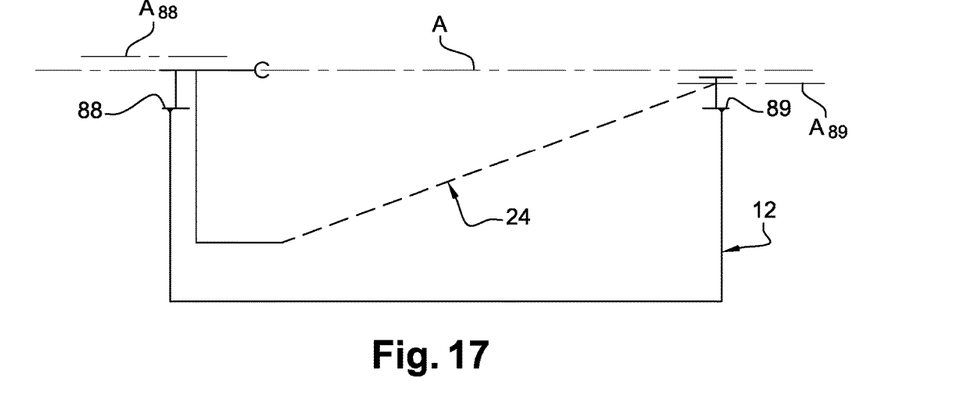
FIG. 17 is a schematic view of a first step of static adjustment of a balancing machine for a method for adjustment before balancing according to the invention.

Firstly, a first step of static adjustment of the balancing machine is performed, during which the coaxiality of the semi-cylindrical bearing surfaces 88, 89 of the balancing machine is adjusted so that they are coaxial as shown in FIG. 17. Thus, the axes $A_{88}$ and $A_{89}$ of the semi-cylindrical bearing surfaces are adjusted so that they form only one axis A.

In this manner, the balancing machine is able to receive the first and second supports 84, 94 of the frame 24 in a configuration of coaxiality corresponding to the actual configuration of the rotor 16 to be balanced.

Any means known from the prior art can be used to verify this coaxiality.

Then, as shown in FIG. 16, the reference stator housing 14' and the reference rotor 16' are arranged in the frame 24 so as to shift the leg 50 and the leg 52 of the frame 24, the frame then being in a load configuration corresponding to that of the balancing operation.

Then during a third step, the frame 24 fitted with the reference rotor 16' and the reference stator housing 14' is transferred onto the semi-cylindrical bearing surfaces 88, 89 of the balancing machine 12.

The adjustment performed during the first step of static adjustment of the balancing machine ensures that the semi-cylindrical bearing surfaces of the balancing machine 12 accommodate the supports 84, 94 of the frame 24 in a satisfactory alignment.

Figure 18:
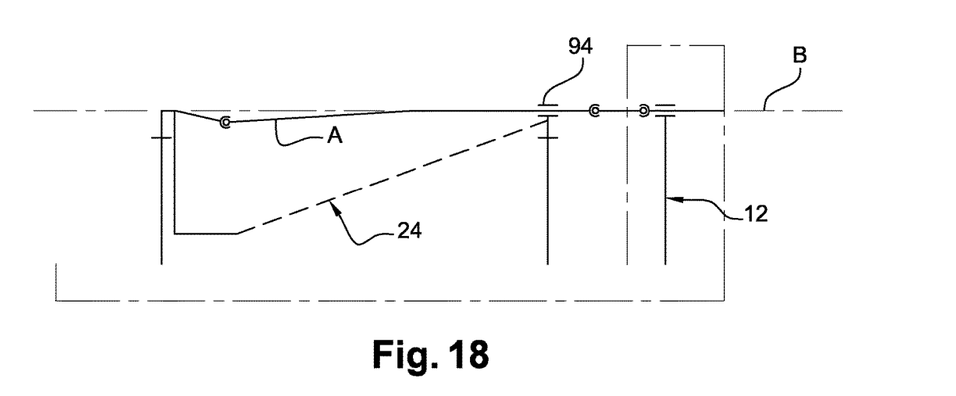
FIGS. 18 and 19 are schematic views showing the second step of dynamic adjustment of a method for adjustment before balancing according to the invention.
Figure 19:
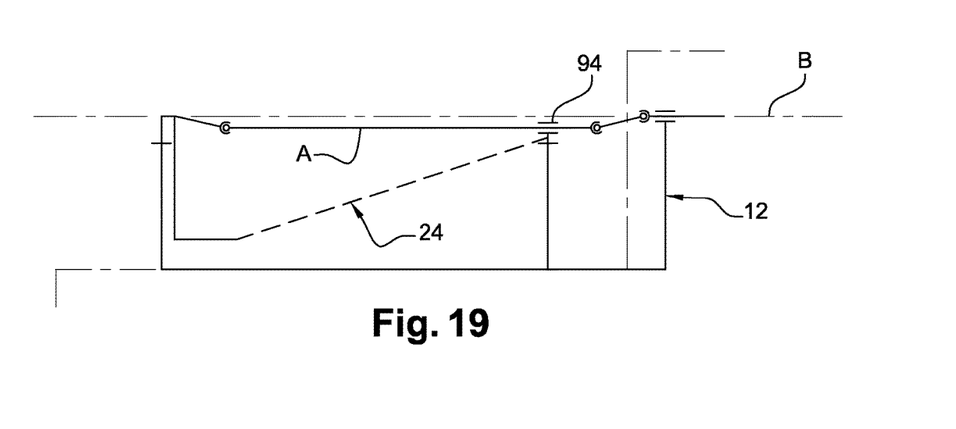

It is then necessary to perform a fourth step of dynamic adjustment on the balancing machine during which the vertical position of the rollers 92 of the plate 90 is adjusted, by adjusting the position of the plate 90 relative to the second support 94, so as to pass from an uncontrolled position of inclination of the axis A of the rotor 16', as shown in FIG. 18 in which the axis A of the rotor 16' forms an unspecified angle with the axis B of the balancing machine 12, to an adjusted position in which the axis A of the reference rotor 16' is parallel to the axis B of the balancing machine. The parallelism of said axes A, B prevents the rotor 16 from having an unbalance that is detrimental to a satisfactory measurement.

This adjustment should then be retained by perforating the plate 90 and the support 94 and inserting the rods 96 therein so as to maintain this position, then the screws 98 are tightened so as to definitively immobilise the plate 90 relative to the second support 94.

It is therefore possible from that moment to remove the frame 24, which is now adjusted in a definitive position, from the balancing machine 12. The reference rotor 16' and the reference housing 14' are then removed from the frame 24, the frame 24 then being ready to receive an actual module 10 having a rotor 16 and a stator housing 14 in order to be balanced.

Advantageously, since the frame 24 and the balancing machine 12 are adjusted once and for all for all rotors 16 of the same type, this configuration offers a significant time saving in the context of balancing a series of identical rotors 16, because the adjustments allow the balancing operation to be repeated without any intermediate adjustment.

The invention claimed is:

1. Tooling for balancing a turbine engine module in a balancing machine, said module having at least one stator housing and a rotor having a shaft with a longitudinal axis A and at least one blade stage which is connected to a longitudinal end portion of said shaft and which is surrounded by said stator housing, wherein said tooling has at least:
- a balancing frame, having bearings designed to receive and to guide the shaft and the blade stage of the rotor, the position of at least one of said bearings being adjustable relative to said frame;
- first and second attaching means designed to be attached to said stator housing;
- third and fourth attaching means provided on said frame, to attach said first and second means, respectively, to said frame, the position of at least one of said third and fourth means being adjustable relative to said frame;
- transporting means for transporting the frame;
- supporting means for supporting the frame, provided on said frame and designed to cooperate equally well with the balancing machine and with the transporting means for transporting the frame, in order to support said frame in said transporting means for transport and in said balancing machine.

2. Tooling according to claim 1, wherein the tooling has removable locking means for locking the rotor relative to the stator housing, said removable means being intended to immobilise the rotor relative to the stator housing while the rotor is being transported to the balancing machine.

3. Tooling according to claim 2, wherein the first attaching means have an annular plate, which is designed to be attached to a first end of the stator housing, which is intended to cooperate with the third attaching means provided on the frame, and an inner peripheral edge of which has the seventh removable locking means for locking the rotor.

4. Tooling according to claim 3, wherein the second attaching means have a ring, which is designed to be attached to a second opposite end of the stator housing, which is intended to cooperate with the third attaching means provided on the frame, and which has an adjusting means for adjusting a vertical position and a transverse position of the stator housing.

5. Tooling according to claim 1, wherein the balancing frame has, at a first end near the stator housing, a first offset support guide bearing, which has a tubular element of which a first end, intended to be introduced into the stator housing, has at least one bearing for rotatably receiving a support shaft received in the blade stage, and of which a second opposite end, intended to project outside the stator housing, has at least one peripheral bearing surface which is clamped to a first support that is rigidly connected to the frame.

6. Tooling according to claim 5, wherein the balancing frame has, at a second end, a second guide bearing with rollers that has a plate carrying two rollers on which the shaft is intended to roll, said plate being carried by a second support that is rigidly connected to the frame, and the position of said plate being capable of being adjusted transversely and vertically relative to said second support, then immobilised definitively in an adjusted position by pins traversing the plate and said second support, and locked in said adjusted position by clamping screws arranged with clearance between the plate and the second support.

7. Tooling according to claim 1, wherein the transporting means for transporting the frame have a trolley capable of carrying the frame.

8. Tooling according to claim 7, wherein the balancing frame has, at a first end near the stator housing, a first offset support guide bearing, which as a tubular element of which a first end, intended to be introduced into the stator housing, has at least one bearing for rotatably receiving a support shaft received in the blade stage, and of which a second opposite end intended to project outside the stator housing, has at least one peripheral bearing surface which is clamped to a first support that is rigidly connected to the frame, wherein the balancing frame has, at a second end, a second guide bearing with rollers that has a plate carrying two rollers on which the shaft is intended to roll, said plate being carried by a second support that is rigidly connected to the frame, and the position of said plate being capable of being adjusted transversely and vertically relative to said second support, then immobilized definitively in an adjusted position by clamping screws arranged with clearance between the plate and the second support, wherein the first and second supports have a semi-cylindrical cross section and in that the transport trolley and the balancing machine have semi-cylindrical receiving bearing surfaces that are adjustable transversely and vertically and are complementary to said first and second supports, and means for clamping said first and second supports which form the supporting means for supporting the frame, in said receiving surfaces.

9. Tooling according to claim 3, wherein the tooling has a first lifting means for lifting the module, having slings intended to cooperate with the annular plate and having an end support of the shaft of the rotor and which are capable of allowing the module to be lifted, and a removable intermediate support connecting the shaft of the rotor to the stator housing.

10. Tooling according to claim 9, wherein the balancing frame has, at a second end, a second guide bearing with rollers that has a plate carrying two rollers on which the shaft is intended to roll, said plate being carried by a second support that is rigidly connected to the frame, and the position of said plate being capable of being adjusted transversely and vertically relative to said second support, then immobilized definitively in an adjusted position by clamping screws arranged with clearance between the plate and the support, wherein the tooling has a second lifting means for lifting the frame having slings intended to cooperate with the annular plate and with the second support, and which are capable of allowing the frame to be lifted.

11. Tooling according to claim 8, wherein the frame has an open shape that is trapezoid or U-shaped and in that the frame has at least one horizontal leg capable of resting on the trolley and two legs, including at least one vertical leg, of which the ends carry the bearings of the frame.

12. Calibration assembly for adjusting tooling according to claim 11, wherein the calibration assembly has:
- a reference stator housing, consisting of a stack of pig moulds of a mass corresponding to that of the stator housing of the module, and which is intended to rest on the frame in a position corresponding substantially to the point of application of the weight of the stator housing of the module; and a balanced reference rotor, having a moment of inertia and moment of unbalance corresponding substantially to the rotor of the module to be balanced.

13. Method for adjustment before balancing of a balancing machine and of tooling according to claim 11 using a calibration assembly having a reference stator housing, consisting of a stack of pig moulds of a mass corresponding to that of the stator housing of the module, and which is intended to rest on the frame in a position corresponding substantially to the point of application of the weight of the stator housing of the module, and a balanced reference rotor, having a moment of inertia and moment of unbalance corresponding substantially to the rotor of the module to be balanced, wherein the method has:
   a first step of static adjustment of the balancing machine, during which the semi-cylindrical bearing surfaces of the balancing machine are adjusted so that the semi-cylindrical bearing surfaces are coaxial;
   a second step during which the balanced reference rotor and the reference stator housing are installed in the frame;
   a third step during which the frame fitted with the balanced reference rotor and the reference stator housing is transferred onto the semi-cylindrical bearing surfaces of the balancing machine;
   a fourth step of dynamic adjustment on the balancing machine, during which the vertical position of the rollers is adjusted by adjusting the plate relative to the second support, so that the axes A of the bearings are parallel to an axis B of a drive shaft of the balancing machine, then the plate and the second support are perforated and rods are inserted into perforations made in order to define the position of the plate, and lastly the plate is locked relative to the second support.

14. Method for balancing a turbine engine module with a tooling according to claim 10, wherein the method has:
   a first step of lifting and positioning, using the first lifting means, a module in a frame received in the transporting means;
   a second step of transporting the module fitted with the frame to the balancing machine, using the transporting means;
   a third step of lifting and transferring the module fitted with the frame into the balancing machine using the second lifting means; and
   a fourth step of balancing the module in the balancing machine.

* * * * *